UNITED STATES PATENT OFFICE.

CHARLES ARTHUR BROWN, OF LORAIN, OHIO, ASSIGNOR TO AMERICAN STEEL AND WIRE COMPANY, A CORPORATION OF NEW JERSEY.

PROCESS OF PURIFYING WATER.

No. 825,637.     Specification of Letters Patent.     Patented July 10, 1906.

Application filed September 5, 1905. Serial No. 276,961.

*To all whom it may concern:*

Be it known that I, CHARLES ARTHUR BROWN, of Lorain, in the county of Lorain, State of Ohio, have invented a new and useful Process of Purifying Water, of which the following is a full, clear, and exact description.

When a water containing sediment or mud is allowed to stand at rest for a sufficient length of time, the larger portion of the suspended matter is removed from the water by sedimentation. If the proper chemicals be added to a water in this condition, the particles of suspended matter are gathered together in larger masses, the precipitation is more rapid and complete, and the resulting purification is much more rapid and satisfactory. When chemicals are employed to bring about this result, the chemicals so used are termed "coagulants." After a water has been properly coagulated it may be passed through a filter plant at a much higher rate of speed and a better purification effected than if the same water were to be passed through the same system and no chemicals employed. The chemicals which are used for this purpose are in the process converted into insoluble compounds and soluble compounds, the soluble compounds being harmless and inoffensive, the insoluble compounds causing the coagulation to occur and being removed with the impurities which the water contains. Various chemicals have been employed in the past for the purpose of producing this coagulation. Among such substances may be mentioned the different salts of aluminium, iron, lime, and soda. In the process of sedimentation or sedimentation and filtration, or by filtration where no sedimentation is employed, a large percentage of the bacteria, which all natural waters carry to a greater or less extent, is removed from the water either by the processes of sedimentation, filtration, or the combined action of the two. This removal is largely of a mechanical nature. Various attempts have been made to kill the bacteria which these natural waters carry. Various chemicals and processes have been used for this purpose. It has been found possible to practically sterilize a water by the use of some of these methods; but in the majority of instances such treatment did not affect the physical character of the water, and it remained practically unimproved in that respect. If a muddy water containing bacteria were to be subjected to the process of sterilization, the water would not be improved in physical appearance to any great extent, and to bring about such improvement some process of sedimentation or filtration or a combination of these processes would have to be resorted to. If a water be passed through a sand-bed at a sufficiently low rate of flow under proper conditions, the same may be purified to a very great extent, as is exemplified in the slow sand method of filtration. Usually in this process no chemicals are employed. If chemicals are employed to coagulate the water, a much higher rate of filtration is permissible and equally as thorough and complete purification may be effected. In the process of purifying water by sedimentation or filtration or a combination of these two methods where chemicals are employed none of the methods of the past prior to my invention have effected any practical sterilization of the water so purified by chemical means.

The danger of using an unpurified water for domestic purposes is very largely due to the fact that most of our natural waters are contaminated to a greater or less extent by sewage. If all traces of sewage contamination can be removed, such a water will be safe for human consumption even if the physical appearance of the same may be objectionable. Sewage contamination is indicated by the presence of various species of bacteria. Among these may be mentioned the *Bacillus coli-communis* and the *Bacillus typhosus*. So far as we now know the *Bacillus coli-communis* is not dangerous; but it is normally present in all sewage, and therefore serves as an indication of sewage contamination. As a general statement it may be said that any sewage-contaminated water will at some time or other contain the bacillus of typhoid fever. The purification of a public water-supply is effected to bring about the removal of these two species of bacteria and also to clarify the water, so as to render same suitable for use. In the present state of our knowledge it is thought that if a water be free from *Bacillus coli-communis* there will be no sewage contamination and that therefore the water will be safe for human consumption. In all processes of sedimentation, filtration, or sterilization the end sought has been the clarification of the water and the removal of these particular forms and the rendering of the water so purified safe and suitable for human usage. By the use of coagulants and sedimentation or filtration or a combination of these two processes it has been found possible to remove large percentages of the mud and bacteria which the natural water carries. It has been known for some time that sulfate of copper if applied to a water-supply in sufficient quantities would bring about a practical sterilization of such water-supply by effecting the death of the two species of bacteria above spoken of; but the amounts required were so large as to make the process of little public utility.

I have discovered that by combining sulfate of copper with sulfate of iron in small proportions as a combined coagulant and germicide equally as good germicidal results can be obtained as if copper sulfate alone were employed in larger quantities, while the coagulating value of the sulfate of iron is not in any way interfered with, and these results can be obtained at a cost which renders the process a commercial and practical one. A test of this process was made at the city of Lorain, Ohio, in a mechanical filter plant having a daily capacity of three million gallons per twenty-four hours at normal rate of operation. This plant furnishes a purified water for use of the entire city of Lorain. Two tons of copper-iron sulfate were used in this test. Varying amounts of this mixture were dissolved in the chemical-tanks of said mechanical filter plant and injected into the water on its way to the settling-basins composing a part of this plant. About one and one-half grains of this substance were used for each gallon of water treated, and a smaller amount of caustic lime was also injected into each gallon of the water so treated. A perfect coagulation resulted which separated from the water partly in the sedimentation-basins and partly in and on the sand-beds composing a part of said mechanical filter plant. It was found as a result of this test that all of the *Bacillus coli-communis* was either killed or removed from the water. As this is considered the most reliable test for the presence of sewage, it was judged that its absence from the filter-water indicated the entire absence of sewage contamination. It may be stated that this bacillus is ordinarily present in the untreated water entering the filter plant at this point almost universally and was so present at the time these tests were conducted. A larger quantity of sulfate of iron containing copper sulfate was then manufactured and shipped to Anderson, Indiana, where a new filter plant was about ready to be started in service, and a test was conducted there in which the same results were obtained, the filtered water being free from any traces of sewage contamination, save on occasions where some error in the process would lead to the imperfect operation of the chemicals. A later test was conducted at Marietta, Ohio, on another filter plant, and in this last test complete removal and destruction of the sewage pollution resulted. From these trials of the process it has been proven that this combination of sulfates of iron and copper in connection with the use of caustic lime when used in plants of this description, embodying the principles of sedimentation, filtration, or a combination of these two, is capable of producing a water free from suspended matters and sewage contamination, and therefore a safe and pure water for human consumption.

The process is new in employing in combination with sedimentation or filtration or a combination of the two a compound which acts as a germicide and a compound which acts as a coagulant whether added together or at different times, and therefore, broadly considered, other coagulants than sulfate of iron, such as alum, may be employed. It is also new in employing a mixture of the sulfate of iron and copper preferably with caustic lime which is applied in the form of milk of lime, lime-water, or dry hydrated lime. The caustic lime added in small proportion, either simultaneously with the sulfate or at another time, removes practically all of the iron and copper from the water by sedimentation or by sedimentation and filtration. All of the chemicals are preferably added in the sedimentation-tanks or just previous to reaching the sedimentation-tanks. The proportion of sulfate of copper employed will vary according to the condition of the water. Ordinarily about one part of sulfate of copper to ninety-nine parts of sulfate of iron will suffice, the mixture being used, preferably, in the proportion of 1.5 grains per gallon of water; but the proportions may be varied, and as much as ten per cent. or as little as .5 per cent. of sulfate of copper or less in the sulfate mixture may be used.

In the practice of my new process as above described the sulfate of copper or other equivalent compound is decomposed and the copper is precipitated in the form of a carbonate or hydrate or a mixture of these, forming a germicidal layer on the sand-bed through which all of the water is filtered.

I claim—

1. The herein-described method of purifying water, which consists in treating the water with a coagulant compound in the presence of a relatively smaller amount of a compound which is decomposed to form a germicidal precipitate, and filtering the water through such precipitate.

2. The herein-described method of purifying water, which consists in treating the water with a coagulant compound in the presence of sulfate of copper, the latter being decomposed and precipitated to form a germicidal layer, and filtering the water through such precipitate.

3. The method herein described of purifying water, which consists in treating the water with a coagulant compound in the presence of sulfate of copper, and filtering.

4. The method herein described of purifying water, which consists in treating the water with sulfate of iron and sulfate of copper.

5. The method herein described of purifying water, which consists in treating the water with sulfate of iron and sulfate of copper, and filtering.

6. The method herein described of purifying water, which consists of treating the water with sulfate of iron and sulfate of copper, and caustic lime.

7. The method herein described of purifying water, which consists of treating the water with sulfate of iron and sulfate of copper, and caustic lime, and filtering.

8. The method herein described of purifying water, which consists of treating the water with sulfate of iron and a smaller proportion of sulfate of copper.

9. The method herein described of purifying water which consists of treating the water with sulfate of iron and a smaller proportion of sulfate of copper, and filtering.

10. The herein-described method of purifying water, which consists in treating water with a soluble sulfate of sesquioxid forming substance and a germicide compound which is decomposed and precipitated to form a germicidal layer, and filtering the water through such layer, the amount of the germicide compound being less than the amount of the coagulant substance.

11. The method herein described of purifying water, which consists in treating the water with a soluble sulfate of a sesquioxid-forming substance, and sulfate of copper.

12. The method herein described of purifying water, which consists in treating the water with a soluble sulfate of a sesquioxid forming substance, and sulfate of copper, and filtering.

In testimony whereof I have hereunto set my hand.

C. ARTHUR BROWN.

Witnesses:
  C. P. BYRNES,
  GEO. B. BLEMING.